Patented July 12, 1927.

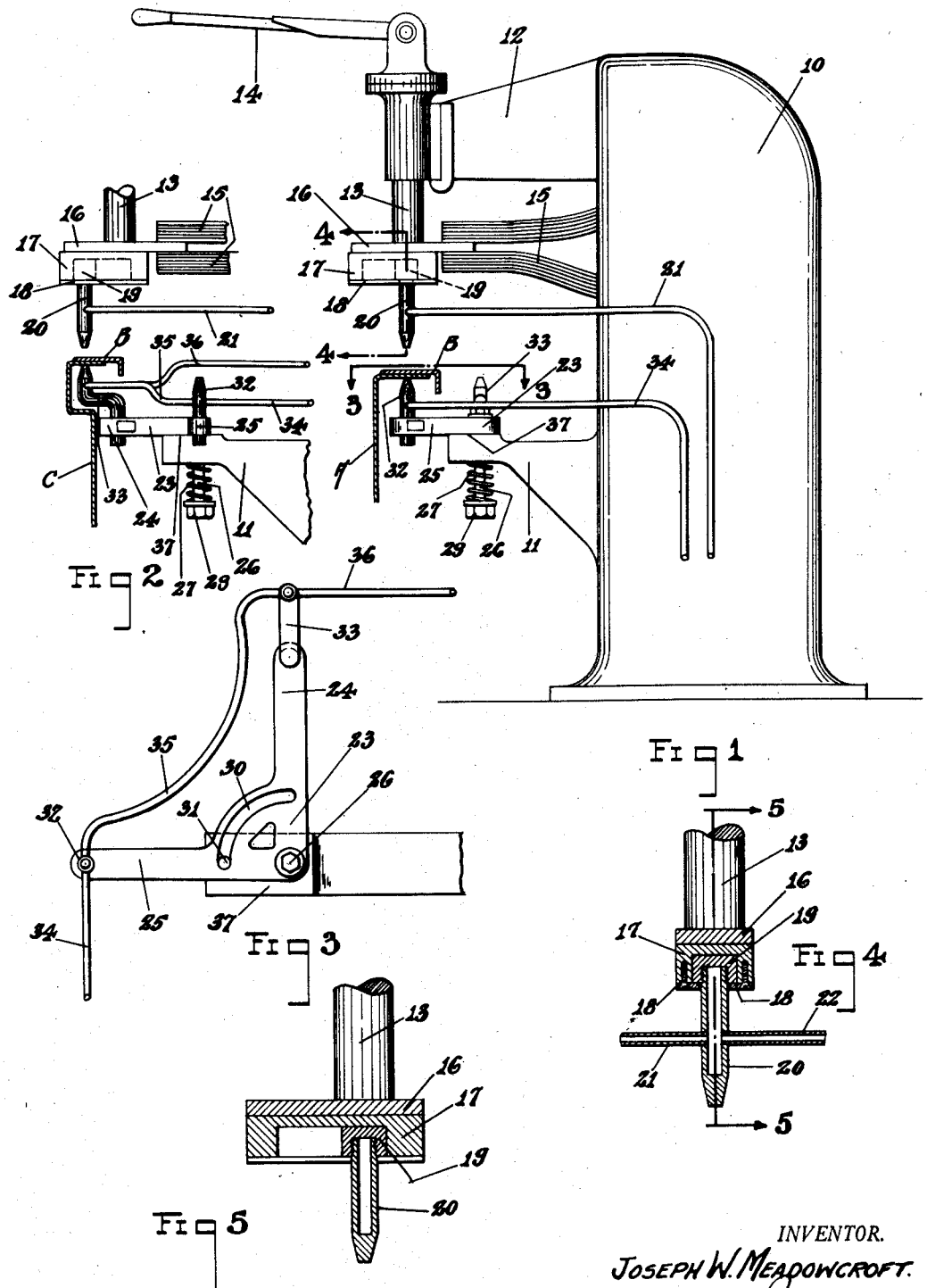

1,635,582

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING MACHINE.

Application filed June 30, 1923. Serial No. 648,680.

My invention relates to improvements in electric welding machines and has to do, more particularly, with that type of electric welding machine known as a spot-welding machine.

The principal object of my present invention is to provide improvements in electric spot-welding machines by means of which a plurality of different electrodes may be used in the same machine, selectively, according to the character of the work to be welded. It is customary to use a straight electrode for most welding operations but it sometimes happens that the shape of the pieces to be welded together is such that the points, at which the welds are to be made, are not accessible to straight electrodes and it is, therefore, necessary to use an electrode which is offset or of some other shape, such as to permit the positioning of the pieces to be welded in proper relation with respect to the electrode. In manufacturing operations where a large number of welds are to be made, upon pieces of many different shapes, it has been necessary, heretofore, when the operator wished to weld two pieces of metal together at points which required an offset electrode, or an electrode of some other peculiar shape, either to change the set up of the machine by substituting the offset electrode for the straight electrode, or to make these welds on a special machine equipped with such offset electrode. The first course requires considerable time and labor. The latter course requires the transfer of the work from one machine to the other. The object of my present invention is to provide an electric welding machine in which any one of several types of electrodes may be used and in which the operator may shift from the one type of electrode to the other, when required to do so by the character of the work, very quickly and easily.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in side elevation of an electric welding machine embodying my invention.

Fig. 2 is a fragmentary view, corresponding to a part of Fig. 1, but showing the electrode carrier shifted to bring another of its electrodes into operative position.

Fig. 3 is a fragmentary, plan view of the fixed arm of the welding machine, taken on the line 3—3 of Fig. 1.

Fig. 4 is a detail, sectional view, taken on the line 4—4 of Fig. 1, and

Fig. 5 is a detail, sectional view, taken on the line 5—5 of Fig. 4.

In the drawings, the same reference numerals refer to the same parts throughout the several views and the sectional views are taken looking in the direction of the arrows at the ends of the section lines.

The ordinary spot welding machine consists of two electrodes connected to opposite sides of a source of welding current such as a transformer, and means for reciprocating one of these electrodes with respect to the other, so as to bring them into contact, under pressure, with opposite sides of the pieces to be welded together, with the result that the welding current flows from one electrode to the other, through the pieces to be welded, at the spot of contact. My invention consists in substituting for one of these electrodes a plurality of electrodes connected to the same side of the source of welding current and shiftable laterally so that any one of said electrodes may be moved into position to cooperate with the electrode which is connected to the opposite side of the source of welding current. These shiftable electrodes may very well be different in size or shape, so that they are suited to work of different character, thus extending the operative range of the machine. I propose to mount a shiftable carrier on the fixed arm of the welding machine which is connected to one side of the source of welding current and carries a plurality of electrodes, so that, by shifting this carrier, any one of said electrodes may be brought into operative position. These electrodes may be connected with a suitable cooling system and I find it desirable to connect them in series so that the cooling fluid flows from one electrode to the other, as it flows through the system. I may use, in connection with such a shiftable carrier having a plurality of electrodes, a reciprocable electrode carried by a shiftable carrier, such as is disclosed and claimed in my copending application for patent on electric welding machines, Serial No. 569,577, filed June 20, 1922, but I am not to be restricted to such use because a reciprocating electrode of the ordinary type may be used, without departing from the spirit of my invention.

Referring to the numbered parts of the drawings, in which there is illustrated a spot welding machine constituting one embodiment of my invention, the frame, 10, of the machine is provided with an upper arm, 12, and a lower arm, 11. A plunger, 13, is mounted at the end of the arm, 12, so that it may be reciprocated by the lever, 14. The lower end of the plunger, 13, carries a bar, 16, which is connected by the lead, 15, with one side of a welding transformer, not shown. The opposite side of said transformer is connected to the lower, fixed arm, 11, which arm is of good conducting material, such as copper. A channel bar, 17, is secured to the lower face of the bar, 16, and forms a guide-way in which the block, 19, is slidable, said block being retained in the guide-way by the plates, 18, which are fastened to the lower surface of the channel, 17, and overhang the guide-way, as shown in Fig. 4. An electrode, 20, is carried by the block, 19, and extends downwardly through the slot or space between the adjacent edges of the plates, 18. The electrode, 20, is hollowed out after the usual manner, so as to receive cooling fluid from a cooling system, to which the interior of said electrode is connected by the conduits, 21 and 22.

At the outer end of the lower, fixed arm, 11, there is provided a plane surface, 37, on which rests an electrode carrier, 23. This electrode carrier, in this instance, is in the form of a bell-crank, having the arms, 24 and 25, and pivotally connected to the arm, 11, by the bolt, 26. This bolt extends through the bell-crank, 23, and through the end of the arm, 11, and extends downwardly some distance below the latter, as shown in Figs. 1 and 2. A spring, 27, is interposed between the head, 29, of said bolt and the lower surface of the arm, 11. This spring, therefore, yieldingly holds the bell-crank, 23, in intimate contact with the surface, 37, of the arm, 11, so as to maintain good electrical contact between these two parts. The bell-crank, 23, has an arcuate slot, 30, in which is disposed the pin, 31, carried by the arm, 11. This device serves to limit the swinging movement of the bell-crank or electrode carrier about the bolt, 26. At the outer end of the arm, 24, of the carrier, the electrode, 33, is mounted and the electrode, 32, is mounted at the outer end of the arm, 25. I have shown the electrode, 32, as a straight electrode of the usual type, while the electrode, 33, is offset. The electrodes, 32 and 33, are connected in series in the cooling system, by the conduits, 34, 35 and 36, so that the cooling fluid flows into one of these electrodes, from it into the other electrode, and thence to the point of discharge.

In Figs. 1 and 2, the pieces of metal to be welded together are illustrated in section. In Fig. 1 an angle member, B, is to be welded to a flange at the upper edge of the panel, A. In work of this character, it is possible to use a straight electrode because the work is so shaped that the pieces can be positioned between the cooperating electrodes without difficulty. In Fig. 2, an angle member, B, is to be welded to a flange at the upper edge of a panel, C, which has an offset or channel formation at its upper edge. This offset would interfere with the use of a straight electrode, such as the electrode, 32, and, therefore, an offset electrode, 33, is used. It often happens that the same stamping would have parts formed, as at A, (see Fig. 1) and other parts formed as at C, (see Fig. 2) and, with my improved welding machine, welds can be made at both places without removing the work from the machine. It will be seen that the carrier, 23, may be swung very readily on its pivot, 26, so as to substitute the offset electrode, 33, for the straight electrode, 32, or vice versa. In case it is necessary, the upper electrode, 20, may also be shifted laterally, so as to bring it into precise alignment with the lower electrode, with which it is to cooperate. The welding is accomplished in the usual manner by reciprocating the plunger, 13, so as to bring the upper electrode into contact with the upper surface of the pieces to be welded together in alignment with that one of the electrodes carried by the shiftable carrier which has been brought into operative position by the movement of the carrier. The welding current flows from the transformer, through the electrode, 20, the pieces to be welded together, the lower electrode, the electrode carrier, 23, and the arm, 11, to the opposite side of the transformer, thus making a weld at the spot at which the upper and lower electrodes contact with the pieces to be welded together.

I am aware that the electric welding machine illustrated in the accompanying drawing may be altered considerably, without departing from the spirit of my invention, and, therefore, I claim my invention broadly, as indicated by the appended claims.

Having thus described my invention, what I claim as new and useful and desire to secure by Letters Patent is:

1. In an electric welding machine, the combination of a frame having a relatively fixed arm, a reciprocable plunger carried by said frame, an electrode carried by said plunger and connected to one side of a source of welding current, a bell-crank pivoted on said fixed arm, an electrode mounted at the end of each bell-crank arm and connected to the opposite side of said source of current, said bell-crank swinging about its pivot to bring any one of its electrodes into cooperative relationship with the first-mentioned electrode, and means for reciprocating said plunger.

2. In an electric welding machine, the combination of a frame having a relatively fixed arm, a reciprocable plunger carried by said frame, an electrode carried by said plunger and connected to one side of a source of welding current, a bell-crank pivoted on said fixed arm, means for limiting the swinging movement of said bell-crank, an electrode mounted at the end of each bell-crank arm and connected to the opposite side of said source of current, said bell-crank swinging about its pivot to bring any one of its electrodes into cooperative relationship with the first-mentioned electrode, and means for reciprocating said plunger.

3. In an electric welding machine, the combination of a frame having a relatively fixed arm, a reciprocable plunger carried by said frame, an electrode carried by said plunger and connected to one side of a source of welding current, an electrode carrier pivotally mounted on said fixed arm, spring means yieldingly holding said carrier in contact with said arm to maintain electrical contact between such parts, a plurality of electrodes carried by said carrier and connected to the opposite side of said source, said carrier swinging about its pivot to bring any one of its electrodes into cooperative relationship with the first-mentioned electrode, and means for reciprocating said plunger.

4. In an electric welding machine, the combination of a frame having a relatively fixed arm, a reciprocable plunger carried by said frame, an electrode carried by said plunger and connected to one side of a source of welding current, an electrode carrier, a bolt extending through said carrier and said arm and constituting the pivot for said carrier, a spring surrounding said bolt and interposed between the head of said bolt and said arm to maintain said arm and carrier in intimate contact, a plurality of electrodes carried by said carrier and connected to the opposite side of said source, said carrier swinging about its pivot to bring any one of its electrodes into cooperative relationship with the first-mentioned electrode, and means for reciprocating said plunger.

5. In an electric welding machine, the combination of a frame, a reciprocable plunger carried by said frame, a relatively fixed arm carried by said frame, a laterally shiftable electrode carried by said plunger and connected to one side of a source of welding current, a plurality of electrodes connected to the opposite side of said source of current and carried by said fixed arm, said last-mentioned electrodes being shiftable to bring any one of them into cooperative relationship with the electrode carried by said plunger and to remove any of the others from cooperative relationship therewith, and means for reciprocating said plunger.

6. In an electric welding machine, the combination of a frame, a reciprocable plunger carried by said frame, a relatively fixed arm carried by said frame, a laterally shiftable electrode carried by said plunger and connected to one side of a source of welding current, a carrier pivotally mounted on the end of said fixed arm, a plurality of electrodes connected to the opposite side of said source of current and carried by said carrier, said carrier being shiftable to bring any one of said last-mentioned electrodes into cooperative relationship with the electrode carried by said plunger, and means for reciprocating said plunger.

7. In an electric welding machine, a reciprocable electrode connected to one side of a source of welding current, a plurality of cooperating electrodes having relatively displaced welding positions, and connected to the other side of said current source, said electrodes being laterally shiftable to bring them into aligned relation in their welding positions, and means to reciprocate said reciprocable electrode.

8. In an electric welding machine, the combination of a frame, a reciprocable plunger carried by said frame, an electrode carried by said plunger and shiftable laterally independently thereof, a relatively fixed arm carried by said frame, a plurality of electrodes carried by said fixed arm adapted to be selectively brought into cooperative relationship with said first named electrode.

9. In an electric welding machine, the combination of a frame, a reciprocable plunger carried by said frame, an electrode carried by said plunger and shiftable laterally independently thereof, means for reciprocating said plunger, a relatively fixed arm carried by said frame, a plurality of electrodes carried by said fixed arm adapted to be selectively brought into cooperative relationship with said first named electrodes, and conduits connecting the electrodes on the fixed arm in series with a cooling medium.

In testimony whereof, I affix my signature.

JOSEPH W. MEADOWCROFT.